United States Patent Office 2,876,334
Patented Mar. 3, 1959

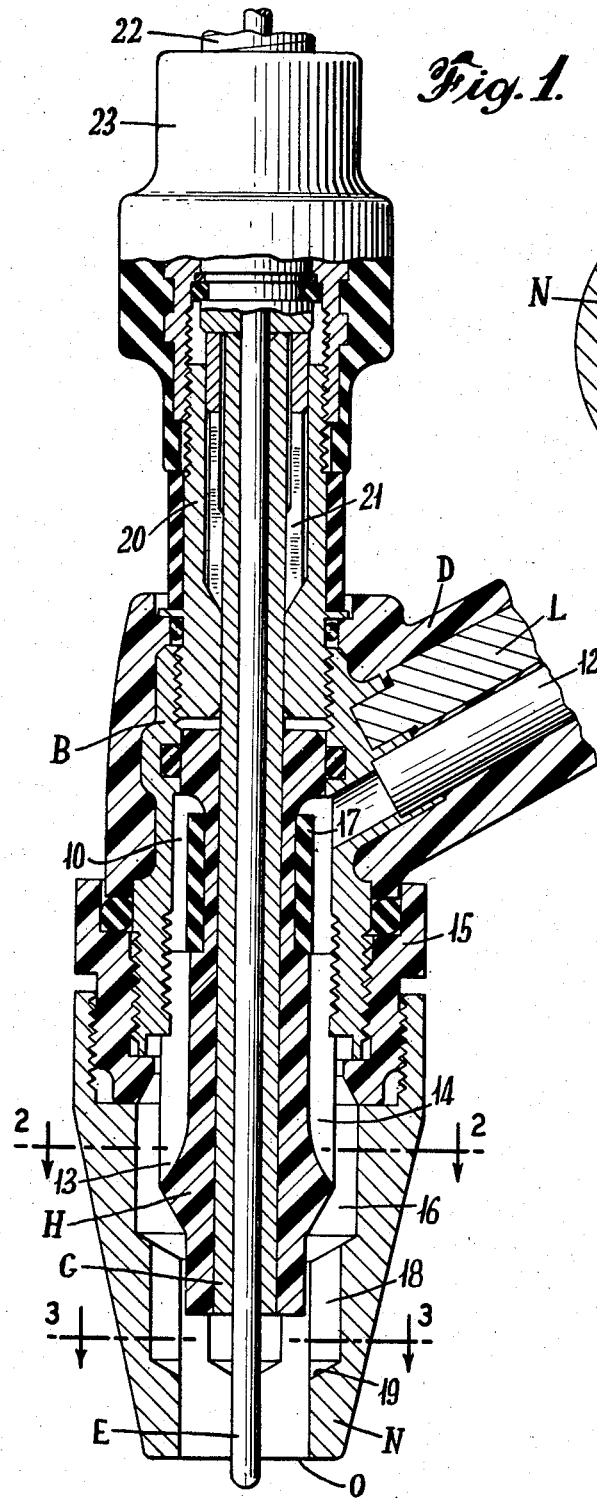
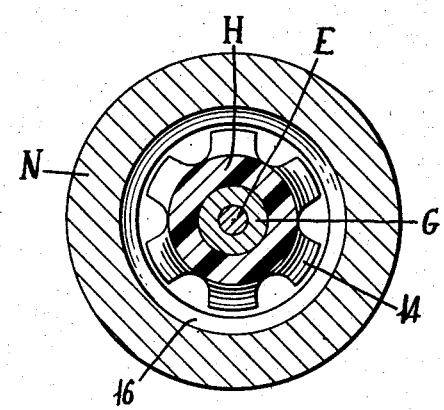
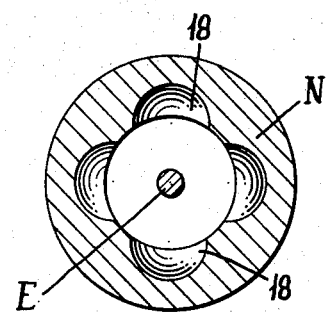
March 3, 1959 — T. J. WOJCIAK ET AL — 2,876,334
GAS SHIELDED METAL ARC WELDING TORCH
Filed Aug. 28, 1956
Fig. 1.
Fig. 2.
Fig. 3.
INVENTORS
THADDEUS J. WOJCIAK
JOHN S. KANE
FRANK T. STANCHUS
BY Richard S. Shreve Jr.
ATTORNEY

2,876,334

GAS SHIELDED METAL ARC WELDING TORCH

Thaddeus J. Wojciak, Elizabeth, John S. Kane, Watchung, and Frank T. Stanchus, West Orange, N. J., assignors to Union Carbide Corporation, a corporation of New York Application August 28, 1956, Serial No. 606,686

11 Claims. (Cl. 219—130)

This invention relates to gas shielded metal arc welding torches and methods, and more particularly to torches and methods of this character in which a consumable wire electrode is fed through a guide tube in the torch, and the shielding gas passes through a gas directing nozzle.

In the copending application of H. E. Kennedy, Serial No. 606,648, filed August 28, 1956, welding material in powdered form is carried by the shielding gas, and means are provided for uniform distribution of the gas-borne powder, and to protect the torch from abrasion by the gas-borne powder. When the powdered material is magnetic, the stream of gas-borne powder is insulated from the current-carrying guide tube, and the gas-borne powder is directed inwardly below the guide tube to cause at least a part thereof to adhere to the welding wire coming out of the guide tube while the shielding gas passes on out through the nozzle discharge orifice.

The main object of the present invention is to improve the powder distribution system.

According to the present invention the powder carrying gas is introduced into an annular entrance chamber in the torch body, and passes through spaced longitudinal passages in an electrode holder of insulating material to a distribution chamber. From the distribution chamber the gas-borne powder passes through spaced flutes in the nozzle and is deflected inwardly against the wire coming out of the guide tube.

In the drawings:

Fig. 1 is a vertical section through a torch according to the preferred embodiment of the present invention;

Fig. 2 is a cross section taken along the line 2—2 of Fig. 1; and

Fig. 3 is a cross section taken along the line 3—3 of Fig. 1.

The torch shown in the drawing comprises a torch body B in which is mounted an electrode holder H for a wire guide tube G through which passes an electrode wire E. Electric welding current is supplied to the guide tube G by a lead-in conductor L provided with an insulating handle D. Surrounding the lower portion of the guide tube G is a gas directing nozzle N concentric with the guide tube and extending therebelow to a discharge orifice O.

According to the present invention the electrode holder H is constructed of insulating material and preferably phenolic gas filled material. The torch is constructed and arranged for passing powder-laden gas down along and outside of the electrode holder H toward the discharge orifice O. In the form shown the upper portion of the electrode holder H is surrounded by an annular entrance chamber 10, to which powder-laden gas is supplied by an inlet conduit 12 in the handle D.

The upper portion of the insulated holder H within the chamber 10 is surrounded by an annular resilient cushion 17, to protect it from the abrasive action of the gas-borne powder. Below the chamber 10 the electrode holder H is provided with longitudinal powder-laden gas passages leading from the chamber 10 and equally spaced around and outside of the electrode holder H. The passages 14 are preferably semicircular flutes formed in the outer surface of the electrode holder H, and cooperating with the body bore to form separate passages, preferably six in number.

The gas directing nozzle N is secured to the body B by means of a plastic insulating sleeve 15 screwed onto the body, the nozzle being screwed onto the sleeve 15. The nozzle encloses an annular distribution chamber 16 surrounding the lower portion of the electrode holder H. The passages 14 terminate in outwardly inclined deflectors 13 for directing the powder outwardly into the distribution chamber 16.

Below the distribution chamber 16, the torch is provided with longitudinal distribution passages 18, leading from the distribution chamber 16 and equally spaced around the outside of the guide tube and extending therebelow toward the discharge orifice O. The passages 18 are preferably semicircular flutes formed in the inner wall of the nozzle N, and preferably four in number. The gas-borne powder coming into the chamber 16 through spaced passages 14 outwardly deflected, and leaving the chamber 16 through a different number of passages 18 inwardly deflected, avoids channeling and effects very uniform powder distribution.

The lower ends of the passages 18 terminate below the bottom of the guide tube G in inclined deflectors 19 for directing the powder inwardly against the electrode wire coming from the guide tube G, to adhere to the electrode wire and be carried thereby into the weld puddle, while the carrier gas proceeds therearound on out through the discharge orifice O to shield the arc and weld puddle.

In the form shown, a part of the body B is formed by a collet body 20, having a bore in which the guide tube G is held by a collet 21. Wire is supplied to the guide tube G by a flexible conduit 22 connected to the guide tube G by a coupling 23.

What is claimed is:

1. Gas shielded metal arc welding torch comprising a torch body, an electrode holder of insulating material in said body, an electrode wire guide tube mounted in said holder, an annular entrance chamber between said body and holder, means for supplying electric welding current to said guide tube, a gas directing nozzle concentric with said holder and forming therewith an annular distribution chamber extending therebelow to a discharge orifice, means for passing powder-laden gas from said entrance chamber down along and outside of said holder toward said distribution chamber, and means below said holder and distribution chamber for deflecting the down coming gas-borne powder inwardly at an angle to the inner surface of said gas directing nozzle toward the wire coming out of said guide tube.

2. Gas shielded metal arc welding torch comprising a torch body, an electrode holder of insulating material in said body, an electrode wire guide tube mounted in said holder, an annular entrance chamber between said body and holder, a torch handle connected to said body, means in said handle for supplying powder-laden gas to said entrance chamber, means in said handle for supplying electric welding current to said guide tube, a gas directing nozzle concentric with said holder and extending therebelow to a discharge orifice, spaced longitudinally extending flutes formed in said holder for passing magnetic powder-laden gas down toward said discharge orifice, and means below said holder for deflecting the down coming gas-borne powder inwardly at an angle to the inner surface of said nozzle above its discharge orifice toward the wire coming out of said guide tube to cause at least a part thereof to adhere to the wire.

3. Gas shielded metal arc welding torch comprising a torch body, an electrode holder of insulating material in said body, an electrode wire guide tube mounted in said holder, an annular entrance chamber between said body and holder, means for supplying electric welding current to said guide tube, a gas directing nozzle concentric with said guide tube and extending therebelow to a discharge orifice, means for passing magnetic powder-laden gas from said entrance chamber down along and outside of said holder toward said discharge orifice, and a resilient cushion surrounding the upper portion of said holder in said entrance chamber to protect it from abrasive action of the powder.

4. Gas shielded metal arc welding torch comprising a torch body, an electrode holder of insulating material in said body, an electrode wire guide tube mounted in said holder, means for supplying electric welding current to said guide tube, a gas directing nozzle concentric with said holder and extending therebelow to a discharge orifice, said holder having longitudinal passages formed in the outside thereof above the bottom of said guide tube and equally spaced therearound, means for supplying powder-laden gas to said longitudinal passages and means below said guide tube and above said discharge orifice and at an angle to the inner surface of said gas directing nozzle for deflecting the gas-borne powder from said passages inwardly toward the wire coming out of said guide tube.

5. Gas shielded metal arc welding torch comprising a torch body, an electrode holder of insulating material in said body, an electrode wire guide tube mounted in said holder, an annular entrance chamber between said body and holder, means for supplying electric welding current to said guide tube, a gas directing nozzle concentric with said guide tube and holder and extending therebelow to a discharge orifice, an annular distribution chamber surrounding said electrode holder, means for supplying powder-laden gas to said annular entrance chamber, and longitudinal distribution passages in said holder leading from said entrance chamber to said annular distribution chamber and equally spaced around and outside of said electrode guide tube and extending therebelow toward said discharge orifice.

6. Gas shielded metal arc torch comprising a torch body, an electrode holder of insulating material in said body, an electrode wire guide tube mounted in said holder, an annular entrance chamber in said body surrounding said holder, means for supplying electric welding current to said guide tube, a gas directing nozzle concentric with said holder forming therewith an annular distribution chamber and extending therebelow to a discharge orifice, an annular resilient cushion surrounding the upper portion of said holder inside said entrance chamber, means for supplying magnetic powder-laden gas to said entrance chamber to impinge against said cushion, and longitudinal distribution passages equally spaced around and outside of said electrode holder and extending from said annular entrance chamber down below said annular resilient cushion to said annular distribution chamber.

7. Gas shielded metal arc welding torch comprising a torch body, an electrode holder of insulating material in said body, an electrode wire guide tube mounted in said holder, an annular entrance chamber in said body surrounding said holder, means for supplying electric welding current to said wire guide tube, a gas directing nozzle concentric with said insulated holder and extending therebelow to a discharge orifice, an annular distribution chamber surrounding said insulated holder, means for supplying magnetic powder-laden gas to said annular entrance chamber, longitudinal distribution flutes formed in the outside of said insulated holder leading from said annular entrance chamber and equally spaced therearound and discharging into said annular distribution chamber, longitudinal distribution flutes in said nozzle below said distribution chamber, and means below said guide tube for deflecting the powder from said nozzle flutes inward toward the wire coming out of said guide tube to be carried by magnetic attraction to the wire while the carrier gas proceeds therearound out through said discharge orifice.

8. Method of electric arc welding with a moving wire consuming electrode connected to a source of welding current, wherein said electrode is fed through a guide tube toward a metal workpiece connected to said source and an arc is struck between said electrode and said workpiece, and a gaseous medium is simultaneously fed in an annular stream through the discharge orifice of a gas directing nozzle to shield the arc, characterized by continuously suspending in said shielding gas powdered welding composition having a magnetic component, passing said powder-laden gas into an annular entrance chamber surrounding the upper portion of said guide tube, taking off powder-laden gas from said annular entrance chamber and dividing it into separate branch streams, passing said separate branch streams in respective paths parallel to said guide tube and angularly distributed therearound, deflecting said separate branch streams outwardly into an annular distribution chamber below said entrance chamber, taking off powder-laden gas from the bottom of said distribution chamber and dividing it into separate lower branch streams, deflecting said lower branch streams inwardly beyond the end of said guide tube to project the gas-borne powder against the electrode issuing from said guide tube and at an angle to the general direction of said annular stream for at least parts thereof to magnetically adhere thereto while combining the carrier gas from said lower branch streams into said annular stream of shielding gas for the arc.

9. Gas shielded metal arc welding torch comprising a torch body, an electrode holder of insulating material in said body, an electrode wire guide tube mounted in said holder, an annular entrance chamber between said body and holder, means for supplying electric welding current to said guide tube, a gas directing nozzle concentric with said holder forming therewith an annular distribution chamber extending therebelow to a discharge orifice means for passing gas laden with powdered welding material having an adherent component from said entrance chamber down along and outside of said holder toward said distribution chamber, and means below said holder and distribution chamber for deflecting the down coming gas borne powder inwardly at an angle to the inner surface of said gas directing nozzle toward the wire coming out of said guide tube to cause at least a part thereof to adhere to the wire.

10. Method of electric arc welding with a moving wire consuming electrode connected to a source of welding current, wherein said electrode is fed through a guide tube toward a metal workpiece connected to said source and an arc is struck between said electrode and said workpiece, and a gaseous medium is simultaneously fed in an annular stream through the discharge orifice of a gas directing nozzle to shield the arc, characterized by continuously suspending in said shielding gas powdered welding composition, passing said powder laden gas along said guide tube, deflecting said powder laden gas outwardly into an annular distribution chamber, taking off powder laden gas from said distribution chamber, deflecting said powder laden gas from said distribution chamber inwardly beyond said guide tube to project at least a part of the gas borne powder against the electrode wire issuing from the guide tube while the carrier gas passes on through said discharge orifice to shield the arc.

11. Method of electric arc welding with a moving wire consuming electrode connected to a source of welding current, wherein the electrode is fed through a guide tube toward a metal workpiece connected to said source and an arc is struck between said electrode and said workpiece, and a gaseous medium is simultaneously fed in an annular stream through the discharge orifice of a gas directing nozzle to shield the arc, characterized by continuously suspending in said shielding gas powdered welding composition having a magnetic component, passing said powder laden gas along said guide tube, deflecting said powder laden gas outwardly into an annular distribution chamber, taking off powder laden gas from said distribution chamber, deflecting said powder laden gas from said distribution chamber inwardly beyond said guide tube to project at least a part thereof against the electrode wire issuing from the guide tube to cause at least a part thereof to adhere to the wire while the carrier gas passes on through said discharge orifice to shield the arc.

References Cited in the file of this patent
UNITED STATES PATENTS

| | | |
|---|---|---|
| 2,606,267 | McElrath | Aug. 5, 1952 |
| 2,659,796 | Anderson | Nov. 17, 1953 |
| 2,694,764 | Muller | Nov. 16, 1954 |
| 2,727,125 | Muller | Dec. 13, 1955 |